(12) United States Patent
Nelson et al.

(10) Patent No.: US 12,579,163 B2
(45) Date of Patent: ***Mar. 17, 2026

(54) SYSTEMS AND METHODS FOR DETECTING PERFORMANCE DEGRADATION IN DISTRIBUTED DATABASE DEPLOYMENTS

(71) Applicant: MongoDB, Inc., New York, NY (US)

(72) Inventors: Cailin Anne Nelson, Boulder, CO (US); Golam Rezwan Khan, New York, NY (US); Duncan Armstrong, New York, NY (US); Jonathan Balsano, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,497

(22) Filed: Feb. 1, 2024

(65) Prior Publication Data

US 2024/0256566 A1 Aug. 1, 2024

Related U.S. Application Data

(63) Continuation of application No. 17/341,532, filed on Jun. 8, 2021, now Pat. No. 11,921,744.

(Continued)

(51) Int. Cl.
*G06F 16/00* (2019.01)
*G06F 16/21* (2019.01)
(Continued)

(52) U.S. Cl.
CPC ............ *G06F 16/27* (2019.01); *G06F 16/212* (2019.01); *G06F 16/9538* (2019.01)

(58) Field of Classification Search
CPC ..... G06F 16/27; G06F 16/212; G06F 16/9538
See application file for complete search history.

(56) References Cited

U.S. PATENT DOCUMENTS 8,161,017 B2 * 4/2012 Hrle .................... G06F 16/2453
707/696
10,241,891 B2 3/2019 Ekambaram et al.
(Continued)

*Primary Examiner* — Khanh B Pham
(74) *Attorney, Agent, or Firm* — Wolf, Greenfield & Sacks, P.C.

(57) ABSTRACT

Systems and methods are configured to identify and resolve user-based issues, architecture issues, and data model issues that are introduced into distributed database deployments. Even in the context of a pre-built distributed database system, "bad" user behavior can have huge impacts on database performance. Various embodiments provide for analysis and resolution of architecture issues, as well schema issues, and can be configured to identify and resolve such problems in the context of dynamic schema database systems. Unlike relational database counterparts, dynamic schema databases do not enforce static database architecture or defined schemas. In such environments, database data and database formatting can be mostly unconstrained. If used properly, this flexibility enables easy configuration and execution. However, when improperly designed, small flaws magnify in significance as the database grows. Various embodiments identify anti-patterns indicative of non-optimal configuration or bad performance, and generate options for resolving them.

20 Claims, 7 Drawing Sheets

100

| Performance Monitor 104 |
| Analysis Component 106 |
| Advisor Component 108 |
| User Interface 110 |

102

Related U.S. Application Data

(60) Provisional application No. 63/036,047, filed on Jun. 8, 2020, provisional application No. 63/036,008, filed on Jun. 8, 2020.

(51) Int. Cl.
  *G06F 16/27*        (2019.01)
  *G06F 16/9538*      (2019.01)

(56)                References Cited

U.S. PATENT DOCUMENTS

| | | | |
|---|---|---|---|
| 11,500,755 B1 | 11/2022 | Plenderleith et al. | |
| 11,921,744 B2 | 3/2024 | Nelson et al. | |
| 2010/0250504 A1* | 9/2010 | Balasubramanian | G06F 16/217 |
| | | | 707/696 |
| 2016/0217054 A1* | 7/2016 | Hadar | G06F 11/008 |
| 2017/0132110 A1* | 5/2017 | Ekambaram | G06F 11/302 |
| 2017/0262638 A1 | 9/2017 | Horowitz et al. | |
| 2017/0286532 A1* | 10/2017 | Horowitz | G06F 16/2428 |
| 2017/0336984 A1* | 11/2017 | Nicol | G06F 3/0661 |
| 2017/0344618 A1 | 11/2017 | Horowitz et al. | |
| 2018/0039560 A1* | 2/2018 | Altman | G06F 16/22 |
| 2018/0096006 A1* | 4/2018 | Das | G06F 16/221 |
| 2020/0244532 A1 | 7/2020 | Knudsen et al. | |
| 2020/0279003 A1* | 9/2020 | Dupont | G06F 16/1744 |
| 2021/0182174 A1 | 6/2021 | Velammal et al. | |

* cited by examiner

100

Performance Monitor 104

Analysis Component 106

Advisor Component 108

User Interface 110

102 mongoDB Atlas

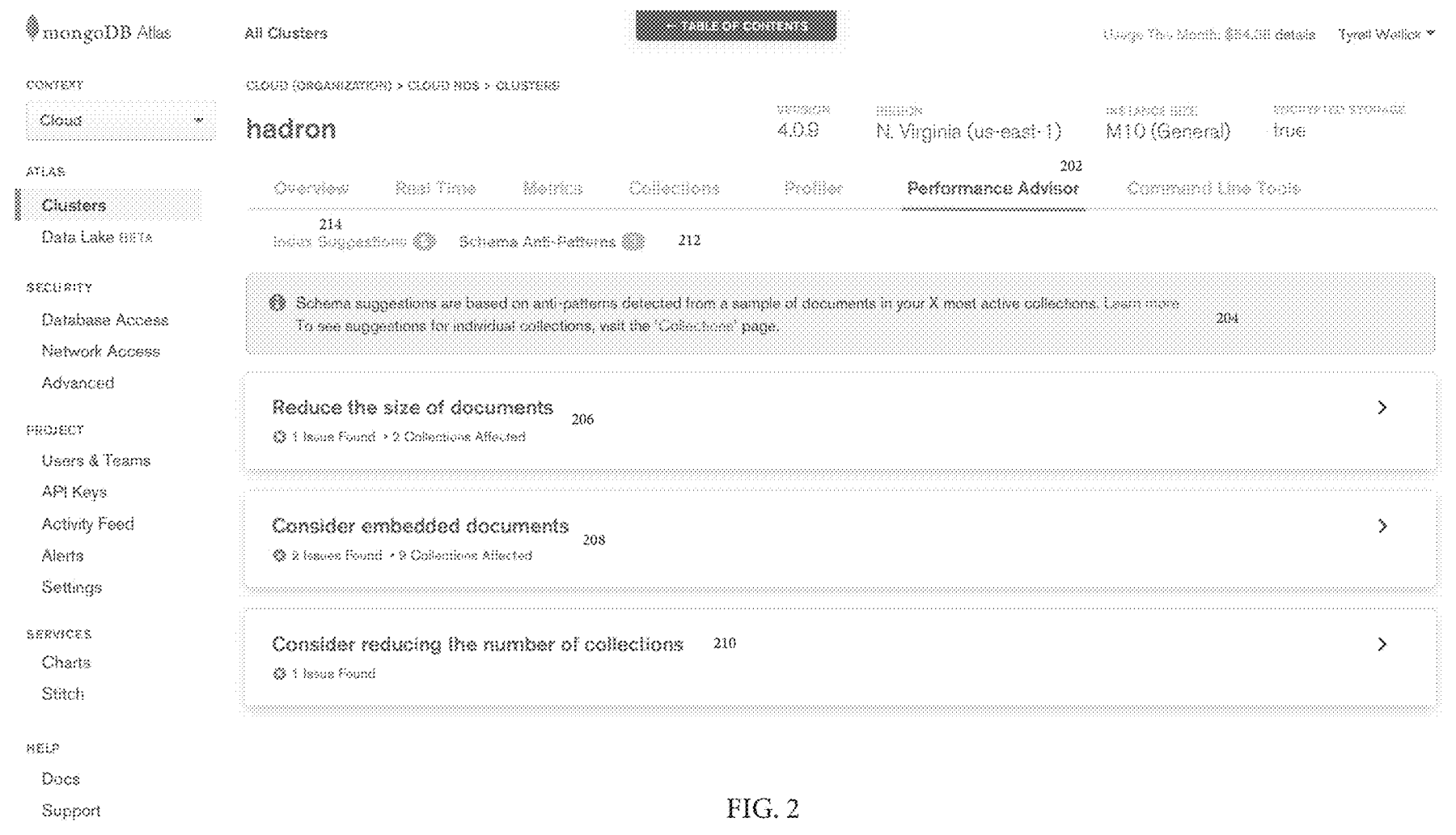

CONTEXT
Cloud

ATLAS
Clusters
Data Lake BETA

SECURITY
Database Access
Network Access
Advanced

PROJECT
Users & Teams
API Keys
Activity Feed
Alerts
Settings

SERVICES
Charts
Stitch

HELP
Docs
Support

All Clusters

CLOUD (ORGANIZATION) > CLOUD R05 > CLUSTERS hadron

Overview    Real Time    Metrics    Collections    Profiler    Performance Advisor Issue Suggestions    Schema Anti-Patterns    212    214

Schema suggestions are based on anti-patterns detected from a sample of documents in your X most active collections. Learn more
To see suggestions for individual collections, visit the Collections page.    204

Reduce the size of documents    206
1 Issue Found > 2 Collections Affected

Consider embedded documents    208
2 Issues Found > 2 Collections Affected

Consider reducing the number of collections    210
1 Issue Found version
4.0.9    region
N. Virginia (us-east-1)    202    instance size
M10 (General)    backup
true Usage This Month @tlas.01 details    Tyrell Walker ⌄

Command Line Tools

FIG. 2

SYSTEMS AND METHODS FOR DETECTING PERFORMANCE DEGRADATION IN DISTRIBUTED DATABASE DEPLOYMENTS

RELATED APPLICATIONS

This application is a Continuation under 35 U.S.C. § 120 of U.S. application Ser. No. 17/341,532, entitled "SYSTEMS AND METHODS FOR DETECTING PERFOR-MANCE DEGRADATION IN DISTRIBUTED DATA-BASE DEPLOYMENTS", filed Jun. 8, 2021, which claims priority under 35 U.S.C. 119(c) to U.S. Provisional Application Ser. No. 63/036,008 entitled "SYSTEMS AND METHODS FOR DETECTING PERFORMANCE DEG-RADATION IN DISTRIBUTED DATABASE DEPLOY-MENTS," filed on Jun. 8, 2020. application Ser. No. 17/341,532 also claims priority under 35 U.S.C. 119(c) to U.S. Provisional Application Ser. No. 63/036,047 entitled, "SYS-TEMS AND METHODS FOR MANAGING DISTRIB-UTED DATABASE DEPLOYMENTS," filed on Jun. 8, 2020. Each application is incorporated herein by reference in their entirety.

BACKGROUND

As distributed database deployments become more per-vasive, and functionality suites become more expansive, management of a distributed database becomes more chal-lenging. Various issues can result from improper architec-ture, data design, and/or demands of distributed execution. Various conventional systems provide automated assistance, and can deliver prefabricated database deployments based on limited client input.

SUMMARY

In various aspects of the present disclosure, systems and methods are described to identify and resolve user-based issues, architecture issues, and data model issues that are introduced into database deployments. For example, even in the context of a pre-built distributed database system, "bad" user behavior (e.g., poor data design, unlimited data objects, interfering definitions and/or references, etc.) can have huge impacts on database performance. Further embodiments provide for analysis and resolution of architecture issues, as well schema issues, and can be configured to identify and resolve such problems in the context of dynamic schema database systems. Unlike relational database counterparts, dynamic schema databases do not enforce static database architecture or defined schemas. In such environments, database data and database formatting can be mostly uncon-strained. If used properly, this flexibility enables easy con-figuration and execution. However, when improperly designed small flaws magnify in significance as the database grows.

For example, the flexibility of the data model can provide improvements in storage and case of use in various settings. However, the flexibility of the underlying data model can contribute directly to operations that inhibit performance and/or optimal execution of a client database. Various embodiments, are configured to identify "anti-patterns" including data constructs, operations, and/or functions that inhibit database performance. According to some embodi-ments, a monitor system can identify such issues at creation of a database deployment, and can further monitor database operation to identify issues in execution. In some examples, the system is configured to identify various issues and identify any resolution and/or provide recommendations. According to one embodiment, the system can be configured to automatically implement fixes to identified anti-pattern constructs.

According to one aspect, a performance monitoring sys-tem is provided. The system comprises at least one processor operatively connected to a memory, the at least one proces-sor when executing configured to identify patterns associ-ated with non-optimal implementation in a distributed data-base deployment; determine a recommendation associated with the pattern and non-optimal implementation; and dis-play in a user interface the recommendation and selectable element configured to render resolution information respon-sive to selection in the user interface.

According to one embodiment, the at least one processor is configured to determine a user context for performance analysis based on, at least in part, selections in the user interface. According to one embodiment, the at least one processor is further configured to limit target data reviewed when executing operations to identify patterns associated with non-optimal implementation based on the determined user context. According to one embodiment, the user context includes a data explorer context and the target data reviewed is limited to a single collection identified in the user inter-face. According to one embodiment, the at least one pro-cessor is configured to generate data shape information from data stored in a distributed database. According to one embodiment, the data shape information maintains secrecy of the underlying data, and is configured for pattern based analysis to determine non-optimal implementation. Accord-ing to one embodiment, the pattern based analysis includes determining a number of array object with in respective document storage units. According to one embodiment, the at least one processor is configured to generate an execution plan to take a database from a first state associated with a non-optimal implementation to a second state resolving the non-optimal implementation. According to one embodi-ment, the distributed database deployment includes a dynamic schema data architecture, data units that comprise documents, and collections that comprise logical groupings of the documents. According to one embodiment, a docu-ment comprises a file and data interchange format that uses human-readable text to store and transmit data objects including attribute-value pairs, references, and arrays. According to one embodiment, the at least one processor is configured to generate collection shapes based on a hash values of respective collections, and associate performance information to the collection shapes.

According to one aspect, a computer implemented method for monitoring performance in a distributed database is provided. The method comprises identifying, by at least one processor, patterns associated with non-optimal imple-mentation in a distributed database deployment; determin-ing, by the at least one processor, a recommendation asso-ciated with the pattern and non-optimal implementation; and displaying, by the at least one processor, in a user interface the recommendation and selectable element configured to render resolution information responsive to selection in the user interface.

According to one embodiment, the method further com-prises determining a user context for performance analysis based on, at least in part, selections in the user interface. According to one embodiment, the method further com-prises limiting, by the at least processor, target data reviewed when executing operations to identify patterns associated with non-optimal implementation based on the determined user context. According to one embodiment, the user context includes a data explorer context and the target data reviewed is limited to a single collection identified in the user interface presented in the data explorer context. According to one embodiment, the method further comprises generating data shape information from data stored in a distributed database. According to one embodiment, the data shape information maintains secrecy of the underlying data, and is configured for pattern based analysis to determine non-optimal implementation. According to one embodiment, the pattern based analysis includes determining a number of array object with in respective document storage units. According to one embodiment, the method further comprises generating an execution plan to take a database from a first state associated with a non-optimal implementation to a second state resolving the non-optimal implementation. According to one embodiment, the distributed database deployment includes a dynamic schema data architecture, data units that comprise documents, and collections that comprise logical groupings of the documents. According to one embodiment, a document comprises a file and data interchange format that uses human-readable text to store and transmit data objects including attribute-value pairs, references, and arrays. According to one embodiment, the method further comprises generating collection shapes based on a hash values of respective collections, and associate performance information to the collection shapes.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 2 is an example screen capture, according to one embodiment;

DETAILED DESCRIPTION

Figure 1:
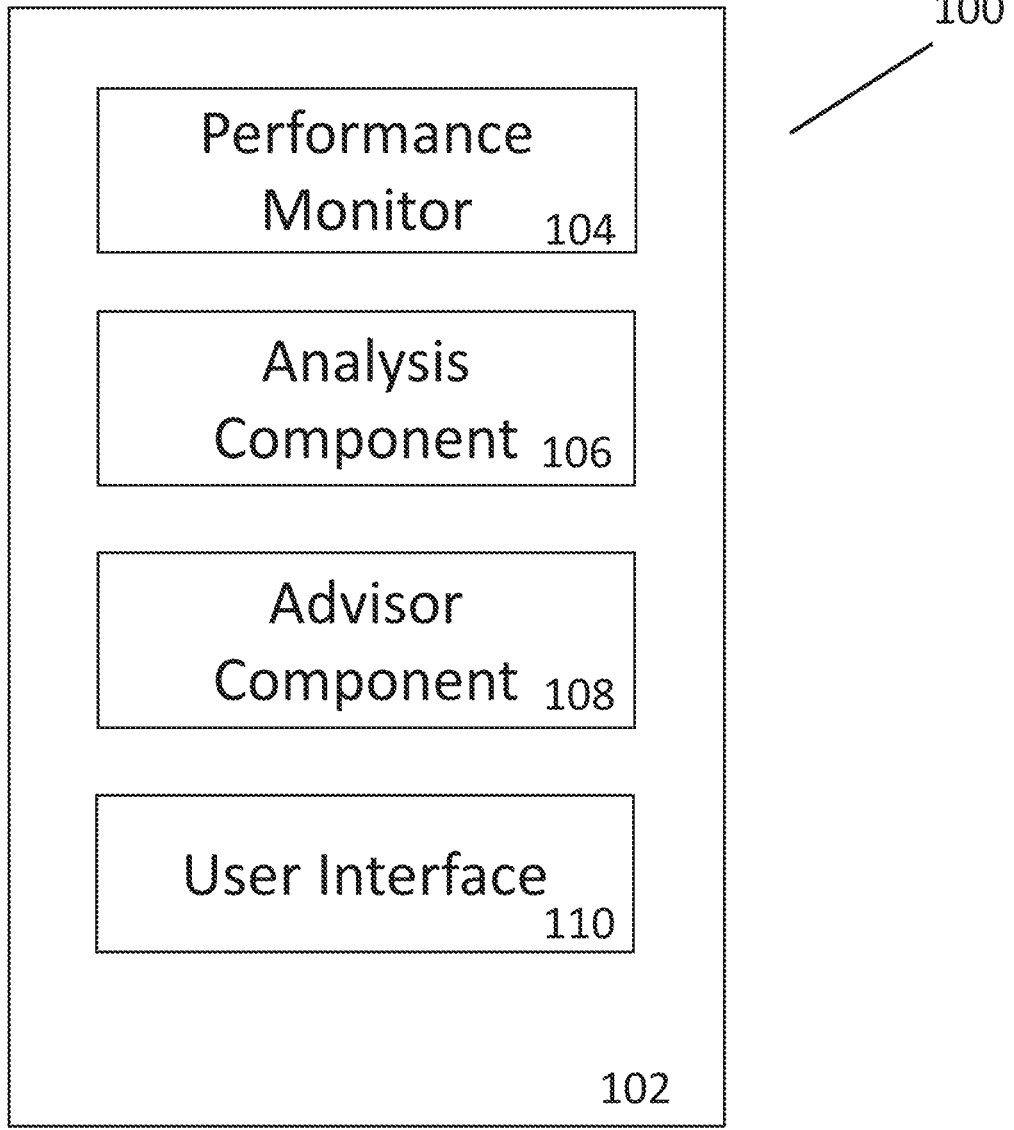
FIG. 1 is block diagram of an example system, according to one embodiment.

Stated broadly, various aspects of the disclosure address problems associated with non-optimal data and/or data architecture in a dynamic schema database. Using the known MONGODB database as an example, a large segment of users do not design their data models with experience under their belt when building applications on top of their database deployment. The lack of experience in dynamic schema settings can be compounded by "relational" or defined schema database habits. In various settings, the result can include use of data models that may not have an immediate effect on performance, but over time, and for example, as the application scales, can become a bottleneck preventing customers running their database efficiently and cost-effectively. In some examples, as non-optimal implementations scale, the increased demand can trigger cascading failures in data operations and failure of an application relying on them. Additionally, as scale increases the challenges to restore an optimal database architecture and data model can be magnified.

Various embodiments of a performance system can be provided to resolve at least some of the issues associated with non-optimal database architecture and/or data model design. According to one aspect, the system can include a performance monitor component configured to monitor data access operations on the database, and for example, deliver performance information on a collection by collection basis as well as global performance information. In various, logical organizations of database data in a dynamic schema architecture can be used to evaluate performance and/or identify sub-optimal configurations. In some embodiments, the system may include an analysis component configured to analyze performance data and/or database metadata to identify problematic architecture or implementation. In some embodiments, the system can include an advisor component configured to identify resolutions for any problematic implementation. The advisor can be configured to implement such resolutions automatically. In further example, the advisor can be operated in an advisory mode, that highlights the identified issues and presents options to resolve. In some embodiments, the system can include user interface functions configured to transition the performance advisor between "advisory" modes and automatic implementation modes.

In the advisory mode, the advisor component can be configured to generate functions and/or sequences of operation to take a database deployment from a non-optimal configuration to an optimal one. In various embodiments, the system also includes a user interface component configured to display any identified non-optimal configuration. The display can include information on the source of any non-optimal configuration, and information on the effects of the identified issue. Further, the system can be configured to construct executable fixes (e.g., state paths from non-optimal to optimal configuration, executables instructions to resolve, etc.) that can be displayed for selection in the user interface.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

FIG. 1 is a block diagram of a performance advisor system 100. The performance advisor system 100 can include a performance engine 102 configured to execute various components of the system 100. In other embodiments and/or alternatives, the performance engine 102 can execute the functions described herein associated with the performance system. In other implementation and/or alternatives the system 100 can execute any of the described functions without instantiation of the engine 102 and/or specific components.

According to one embodiment, the performance system 100 can be executed as a cloud-based service and/or integrated into a cloud-based database deployment. For example, the performance system 100 can be integrated into a database as a service offering, and the performance system can monitor operation of the database, calls, data access requests, etc., to build information on potential non-optimal configurations. In some examples, integration can include access to database metadata, including configuration and/or architecture information that can be analyzed to determine optimization issues.

In further embodiments, the performance system can also be executed in the context of an on the premises database deployment. In on premises deployments, the database system and the hardware to support it are typically located at a client location and the client is responsible for the associated hardware. The performance system can be integrated into the on premises deployment, or called from the on premises systems as a service.

According to various embodiments, the system 100 and/or engine 102 can include a performance monitor component 104. The performance monitor component can be configured to run in the background and deliver detailed metrics on data access requests (e.g. read, write, new, etc.), index usage, lack of index, identify complex data structures, identify lack of complex data structures, etc., among other options. In some embodiments, the performance monitor component 104 can be run on request, for example, as an on-demand service. In yet other embodiments, the performance monitor can be scheduled to run at certain times (e.g., time of day, percent utilization of the database, volume of requests to the database, excessive usage threshold, etc.).

Once performance information has been collected via the performance monitor 104, an analysis component 106 can be executed to determine any non-optimal implementation. For example, the performance metrics can be used to identify specific anti-patterns that results in suboptimal performance. According to some embodiments, the analysis component can also be configured to run independently of the performance metric information, and deliver analysis of database metadata, architecture, and/or analysis of common errors in constructing a database and/or application. According to some embodiments, the analysis component can be configured to analyze database collections (e.g. logical groupings of database data) and/or database clusters, and/or entire databases.

In some embodiments, performance metrics and the results of the analysis component can be transformed into recommendations for actions delivered to end-users. For example, the system can include an advisor component 108 that links performance metrics and/or identified issues to recommended actions. The recommended actions can be tailored to the specific issue and/or specific metric and may also be based on global analysis. According to some embodiments, the system 100 and/or advisor component 108 can be configured to construct executable instructions, and/or state change information to take a suboptimal deployment to an optimal configuration. In yet other embodiments, the system can be configured to identify and execute optimizations on a given database employment. For example, an administrative user can enable automatic updates that implement optimal configurations. In other examples, any identified issues and associated resolutions can be presented to end-users as recommendations, and maybe accompanied by executable selections that will implement the optimizations upon request or selection.

According to some embodiments, the advisor component 108 can present tailored user interfaces (e.g., via user interface component 110) that highlight suboptimal configurations, and may also provide visualizations that rank sets of recommended actions that can be taken. According to one embodiment, the system can include a user interface and display screen for a "performance advisor." The performance advisor display screen can incorporate recommended actions, highlight suboptimal configuration and/or identify changes made to optimize a database deployment. In further embodiments, the user interface component can include displays that are tailored to specific collections in the database (e.g. a "data explorer" screen may be configured to provide recommendations based on a single collection—and for example, order recommendations based on impact for displayed collection).

In further embodiments, the system can identify potential issues, identify potential solutions, and provide recommendations to contact expert advisors to implement potential solutions. In some embodiments, the system can support a dialogue with expert users and provide a client and the expert user information on the performance metrics and/or identified issue so that a collaborative session can be executed to implement selected solutions.

Example Anti-Patterns

According to some implementations, non-optimal or "bad" data models can be the result of one or more or any combination of the following reasons:

1. database implementation is secondary to timetable— (e.g., the end user wants to move fast and not bother with thinking about data models);
2. general inexperience in dynamic schema database and/or document oriented schema design;
3. relational schema design habits are hard to break, and end users may revert to such design for all use cases; and
4. end users cannot not anticipate or are unaware of future cost of bad data models.

The inventors have realized that when a bad data model becomes a performance concern for end users, typically those users lack a good way of even identifying the bad data model as a root-cause. Additionally, the same users often lack the understanding of how to fix the problem. The various embodiments of the performance system provide options for identifying and resolving issues that most users cannot identify nor resolve. Further conventional implementation often fails to identify issues that will not cause problems until scaled to a sufficient degree. For example, some improper database designs will still perform at optimal or threshold performance levels until the application or database has been implemented at scale.

In conventional settings consultants can be brought in to analyze a database architecture and/or data model, and the consultants may or may not identify the potential issues. Such an approach is subject to error and can result in complete re-implementation of a database where subtler fixes could be identified by the system and, in further example, even implemented automatically.

In the advisor mode, the system identifies issues when they are introduced and such knowledge will give the system users tools to facilitate development of good data models and architecture, making their database deployment experience easy, cost-effective, and performant at scale, thus reducing error and ultimately improving database efficiency over various conventional implementations.

Various embodiments can be configured to operate within a range of advisory implementation and within ranges or automatic optimization. According to one embodiment, the system can be configured to identify and advise, and for example, to highlight the most common anti-patterns that can be introduced into a database deployment.

Table A recites a list of example use cases having associated user interfaces to guide the user and benefits of supporting those use cases:

TABLE A

| # | Use Case | Benefit |
|---|----------|---------|
| 1 | Users can check for schema anti-patterns for new apps in development. | Users are more likely to fix bad schemas, since they are in active development mode. Detection during development further avoid compounding issues. |
| 2 | Users can check for schema anti-patterns for apps in production. | Existing apps are scaling-they benefit from anti-pattern detection (e.g., many new biz deals are migrations of existing applications and can resolve even issues from on-premise to cloud transitions). |
| 3 | Advisor Mode-Users can get an alert when a schema anti-patterns for applications in production is detected. | Improves communication and reduces user burden (e.g., in visiting the tool to see recommendations) |
| 4 | Administration Teams/Sales/CSMs have a way to proactively identify customers/clusters with bad schemas, so that they can proactively reach out. | Users may not make changes even with performance issues. The System can notify the user, take automatic action, and/or build evolution plans that can be part of a CSM team or the Self-Service team reaching out to clients with issues. Identifying problems to enable outside technical experts to proactively resolve them is an enhancement not available in many conventional approaches. |
| 5 | Support identified anti-patterns (discussed below) | Identify common anti-patterns were, and extrapolate to other bad model issues-delivers calls to action and/or recommendation to resolve |

TABLE A-continued

| # | Use Case | Benefit |
|---|----------|---------|
| 6 | State Based Changes Proposed by System | Identify common anti-patterns were, and extrapolate to other bad model issues-delivers calls to action and/or recommendation to resolve and "Execute" option for user to select |
| 7 | Customer Subscribes For Optimizations to Occur Automatically | Identify common anti-patterns were, and extrapolate to other bad model issues-delivers database changes identified by calls to action and/or recommendations to resolve-"Execute" option for user to select may be available if scheduled for automatic execution at a later time |

Shown in FIG. 2 is an example screen capture of a performance advisor display, according to one embodiment. The performance advisor display includes a tab-based navigation for identifying and navigating to recommendations on optimal database settings (e.g. 202).

According to one embodiment, the display can be organized to include counts of instances of schema anti-patterns (e.g. at 212) and counts of instances of index suggestions (e.g. 214). In some embodiments, the system is configured to display information on recommended actions or specific calls to action that are relevant to a threshold grouping of a database's most active collections—shown at 204. The user interface can include navigation options to provide additional background information on more optimal configurations and/or settings. In this example, the user interface displays a recommendation to reduce the size of documents (e.g. at 206). In various database deployments, a document can form a base unit of data to hold records in a collection or other grouping of the base unit of data. Documents form a structure composed of file and value pairs which are similar to known JSON objects or other mapping datatypes. In one example, a document used in the dynamics schema database can be based on BSON which is a binary data format similar to JSON but that includes additional type data.

Returning to FIG. 2 at 208 and shown a recommendation to use embedded documents in a data collection. As shown in the display at 208, the source of the issue (e.g. two issues found) can be displayed as well as a display for the number of collections that are affected by the issue. At 210, the user interface provides a recommendation for reducing the number of collections. In one example, the system can detect that the number of collections in a databased appointment exceeds a threshold number and recommend reducing the number of collections below the threshold.

Figure 3:
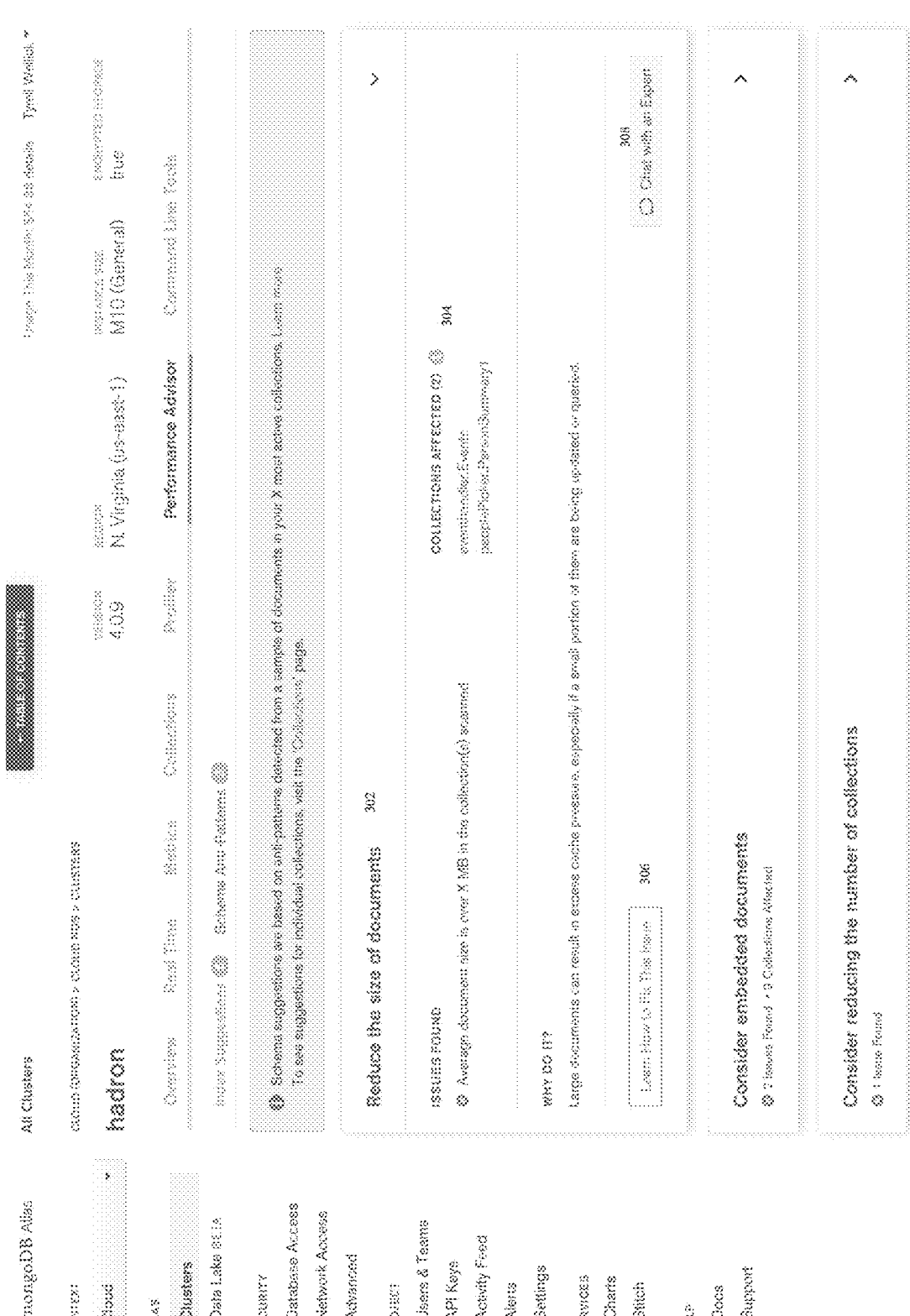
FIG. 3 is an example screen capture, according to one embodiment.

FIG. 3 provides an example screen capture of the user interface once an issue has been expanded. In this example, the system has detected that an average document size is over a threshold number. In this example, the user sees the recommendation at 302 and is given additional detail on the source of the issue that has been identified at 304. The user interface can introduce navigation options for bringing the user to a display of the affected collection and/or database deployment. In some embodiments, the system can be configured to direct a user to architecture and design documents that are linked to the issue and/or recommendation being provided at 306. In further example the system can introduce a UI element that creates a communication session with a database expert who can help resolve the identified issue (e.g. at 308).

Figure 4:
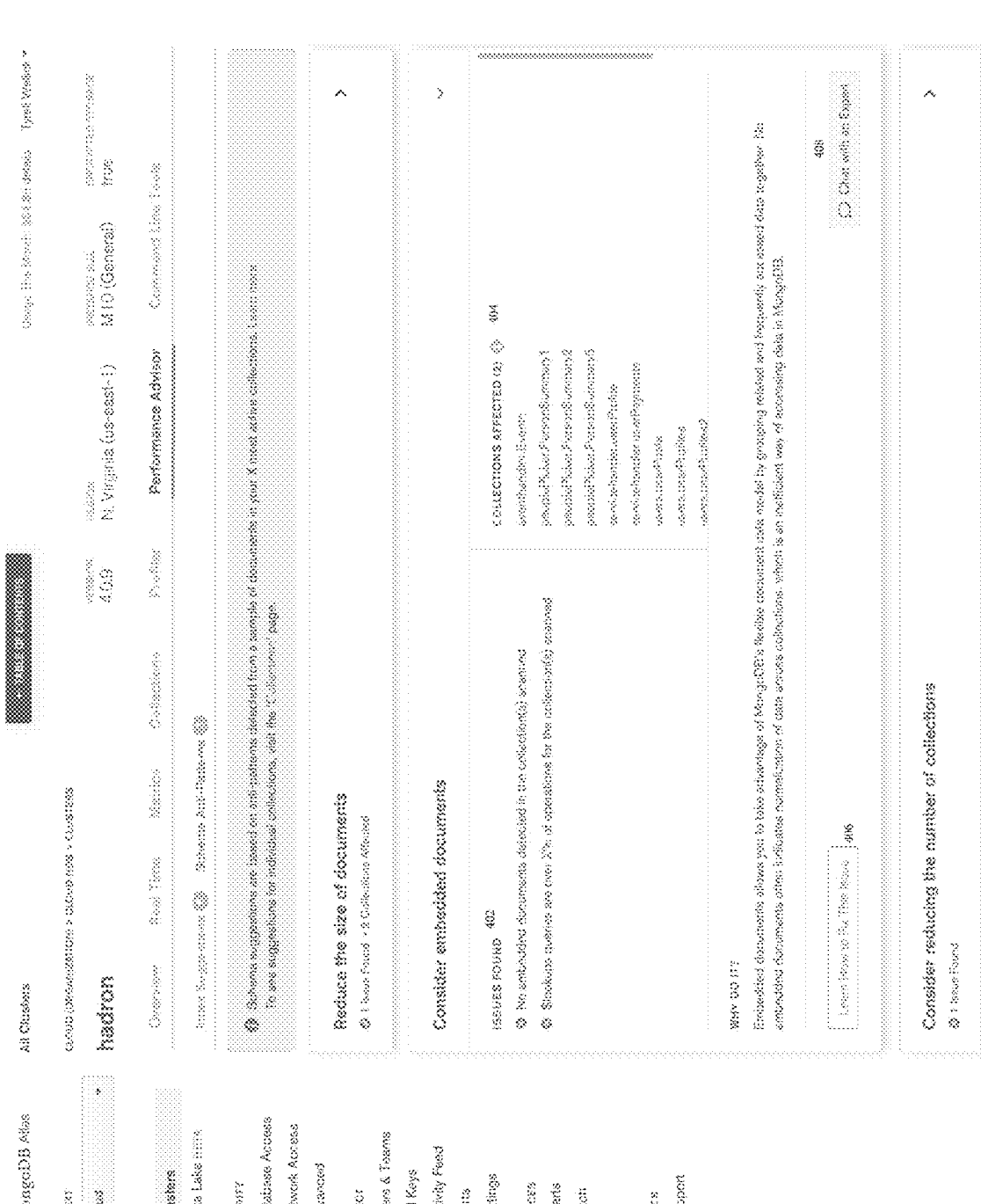
FIG. 4 is an example screen capture, according to one embodiment.

FIG. 4 provides an example screen capture of the user interface responsive to expansion of another issue—"consider embedded documents". Similar to other user interfaces, the expanded issue and/or recommendation can provide additional information on suboptimal operation at 402. For example, the system can identify that no embedded documents exist in the analyzed collections shown at 404 and/or look up queries represent a threshold number of operations on the scanned collections. In various embodiments, lookup operations are expensive for execution on the database and their numbers and usage can be reduced with better data model design. For example, the user can be linked to information on how to better design the collections at issue by selecting 406 or by triggering a chat with an expert at 408.

Figure 5:
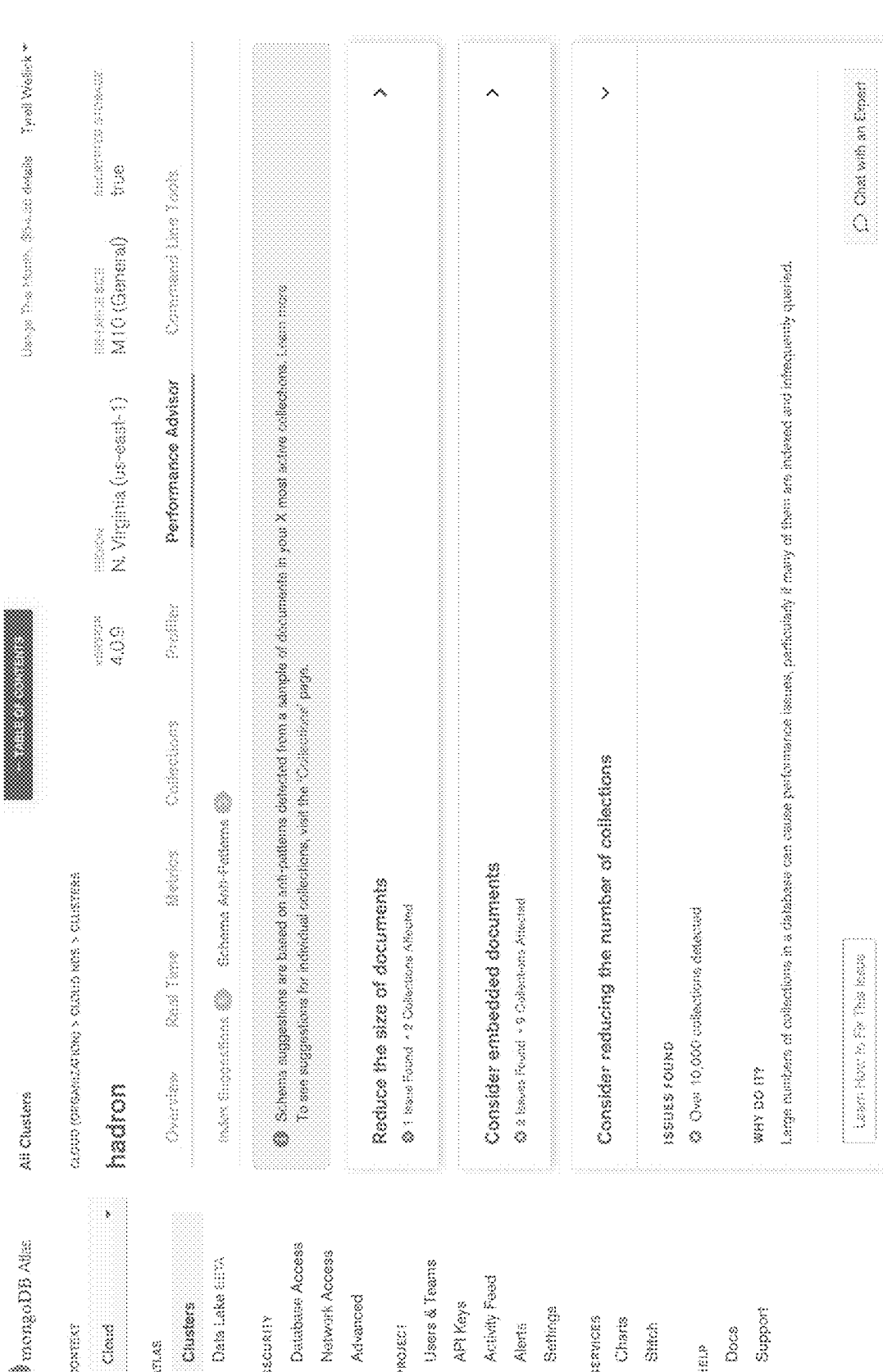
FIG. 5 is an example screen capture, according to one embodiment.

FIG. 5 illustrates another example screen capture and expansion of a recommendation. For example, the system can be configured to determine a threshold for a number of collections that have been exceeded, and trigger the displayed notification at 502. The system can determine and display how may collections are affected by the identified issue (e.g., at 504). In some embodiments, the system is configured to display an explanation to the user of an expected benefit or reasons to avoid the identified issue. Detailed review of the issue can be provided in subsequent displays by selecting "Learn how to fix this issue" at 506. In further embodiments, the system can connect a subject matter expert to guide the user through an update, fix, or change in database architecture, etc. (e.g., at 508). Not shown, the user interface can include options for executing changes automatically to rectify some issues. A "Make this Change" button can be displayed in the interface. Upon selection, the system can execute recommended to changes to resolve identified issues. In one example, the system can identify collections having at least some common data fields for merging to reduce the numbers of collections. In other examples, the system can be configured to identify common access patterns where pairs, triples, or multiple collections are often accessed together. The system can used common access patterns to recommend consolidations of collections into fewer collections or even, for example, one collection.

Implementation Examples

Various embodiments are configured to identify and display anti-patterns in the context of a data explorer (e.g., filter data view mode and tailored recommendations/issue notification). The user interface is configured to provide a display for a data explorer view which highlights schema anti-patterns. In one example, the UI includes a tab shown at the collection level of the database listing issues, recommendations, and/or calls to action for schema anti-patterns detected in that collection. In various examples, the display is configured to order the recommendations based on system determined priority (e.g., greatest known impact, issue on collection having highest utilization, broadest impact (e.g., most collections), etc.). In some examples, the priority thresholds are templated and the server is configured to display the threshold % —and in further example to enable changes to threshold values.

Various embodiments are configured to reuse existing component/pattern/error code from other contexts (e.g., performance analysis on collections, clusters, deployments, etc.). According to one embodiment, the system is configured to fire a segment event on tab load, that includes tracking for anti-patterns found (e.g., patterns described below).

In further embodiments, supporting infrastructure can include new performance advisor endpoint(s) to be called by the schema anti-patterns tab in data explorer, that is configured to use collection-level agent jobs to generate and return a list of schema anti-patterns found for the collection viewed. In one example, the procedure can include (some examples of code/functions is provided for a MongoDB database deployment to highlight some features):

1. Submit Data Explorer jobs, and wait until all responses are available:
   LIST_INDEX_STATS job to list indexes for the given collection
   AGGREGATE job with pipeline [{$sample: {size: X} } ] to collect sample documents
   X=1000 initially (further examples include 2,000, 3,000, 4,000, 5,000, 6,000, 7,000, 8,000, 9,000, etc.
   System is configured to monitor performance impact and determine if the system performance impact from monitoring is too high in practice; or raise to users if too much performance degradation
   Example sample size range: 100-1000
2. Retrieve slow query logs (e.g., using SlowQueryLogSvc)
   Various embodiments can be configured to track slowly executing queries and maintain logs on same.
   Use PerformanceAdvisorSvc.getShapesAndIndexes( ) as a reference
   Use a default time window (e.g., last 24 hours)
3. For each issue, recommendation, call to action, check triggers against sample docs, slow query logs, and index list
4. Return list of all issues, recommendations, call to actions triggered
   Include thresholds used, so UI can inject them into copy Various embodiments are configured to identify and display anti-patterns in the context of global view of a database deployment (e.g., a performance advisor) to determine anti-patterns:

In one example the UI can include a tab alongside for issues, recommendations, and/or calls to action (e.g., for schema anti-patterns) detected across the collections on that host and, for example, the most active collections on that host
   Display can be ordered by priority (e.g., a hard-coded priority or other threshold based priority assignment);
   In other examples, thresholds can be templated and the system can display a threshold value or % (e.g., so the threshold value can be adjusted)
   Displays can include list of collections impacted, and in further example, the UI can include navigation options link to a collection in data explorer context
   Can include "Chat With Expert" InterCom button
   Can reuse existing component/pattern/error code from other advisor analysis
   Fire a Segment event on tab load, tracking anti-patterns found
Supporting infrastructure can include an update the performance advisor endpoint to, in addition to returning index suggestions and collected indexes, use data explorer jobs to generate and return a list of schema anti-patterns found at the host level
   Can reuse slow query logs retrieved for Index Suggestions Can reuse existing indexes retrieved for Index Suggestions In one example, a procedure executed by the system can include (some examples of code/functions is provided based on a MongoDB database deployment to highlight some features):

1. Extract list of namespaces from the existing slow query logs

Order by summed elapsed millisecond for each namespace, descending

Cap list size at X

X=20 initially

2. Submit a Data Explorer LIST_COLLSTATS job to get all namespaces for this host 3. For each namespace, submit a Data Explorer AGGREGATE job and wait until all responses are available:

Use aggregation pipeline [{$sample: {size: X} } ] to collect sample documents

=X=200 initially

Monitor performance impact, adjust accordingly (e.g., lower this if performance impact is too high in practice; or raise it if we get too much flapping)

Example sample size range: 100-1000 (other embodiments can increase sample size (e.g., 2,000, 3,000, etc.)

4. Wait for all Data Explorer job results

5. For each call to action, check triggers against sample docs, slow query logs, index list, and namespace list Track list of triggering namespaces for each call to action 6. Return list of all call to actions triggered Include thresholds used, so UI can inject them into copy to be displayed Include triggering namespaces Some embodiments can parallelize Steps 2-5 above:

Submit all DE jobs without awaiting the responses

For each job, submit an executor job that asynchronously:

1. Retrieves the job response (using the usual polling loop)

2. Runs the job response through the call to action list

Then combined the aggregate call to action recommendations

The call to action processing can be thread-safe

For example, an Executors.newCachedThreadPool( )

Further examples can include support for "busy" collections to anti-patterns analysis:

Include for example an agent: configured to add a new data explorer job, TOP, that runs the "top" command, and returns the raw result Update a performance advisor endpoint to use a new data explorer job (e.g., discussed above) configure to generate a list of namespaces to sample For example this approach can replace Step 1 (find namespaces to sample) and Step 2 (find all namespaces on the host) (above) in the performance advisor endpoint procedure listed above Example Procedure:

1. Submit a data explorer TOP job for the host, and wait for the result

2. Extract the list of namespaces to sample from the TOP result

Order by summed "total" time for each namespace, descending

Cap list size at X

X=20 initially

3. Extract the list of namespaces on the host from the TOP result

Additional Features Can be Implemented in Various Embodiments, and Include in the UI: Addition of a Diagnostic Payload to the UI Endpoints For example, not displayed by UI, but available for debugging (e.g., via developer tools)

Include the actual queries/documents triggering the anti-patterns

System be configured to redact for PII

Example Call-To-Actions:

The following can be ordered by display priority for some examples in descending order and can also apply to any analysis context (e.g., both performance advisor and data explorer contexts, for example), unless otherwise stated Multiple triggers are OR, not AND—unless otherwise specified Some call to actions can include multiple thresholds and weightings between thresholds (e.g., confidence level can also be used)

One "medium" confidence, and one "high" confidence

Use to affect display of call to action cards (red for high, orange for medium)

Enables flexibility and dynamic (e.g., less conservative) with thresholds

The following examples provide a list of call to actions (Calls To Action), which are recommendations driven by anti-patterns.

1. Avoid using unbounded arrays in documents

Trigger:

Any document contains an array of size >X

X=10,000 initially or as a default setting (other options can include >1,000, 2,000, 3,000, 4,000, 5,000, 6,000, 7,000, 8,000, 9,000, etc.)

One examples track arrays of increasing size to predict problematic configuration—in further example recommendation can be provided on predicted issues, which can be changed to actions once thresholds above are reached or close to being reached Leads to inefficient reads and index maintenance 2. Consider reducing the number of collections Applies to Performance Advisor only, not Data Explorer Trigger:

Deployment contains >X namespaces

X=10,000 initially or as a default setting (other options can include >1,000, 2,000, 3,000, 4,000, 5,000, 6,000, 7,000, 8,000, 9,000, etc.)

Some embodiments are specifically configured to monitor namespaces, not collections—where too many DBs is just as bad as few DBs+ many collections—still other embodiments monitor collection numbers and/or associated files (e.g., indexes, etc.)

In some examples, MongoDB namespace is the canonical name for a collection or index in MongoDB. The namespace is a combination of the database name and the name of the collection or index, like so: [database-name]. [collection-or-index-name]. All documents belong to a namespace 3. Remove unnecessary indexes
  Trigger:
    Any collection contains >X indexes
      X=30 initially
    Impacts write loads unnecessarily
4. Consider embedded documents
  Trigger:
    X % of queries use $lookup
      X=50 initially
        Slow query logs can include "appName"
    Y % of collection documents have no embedded document fields
      Y=100 initially
    Implies relational design patterns
5. Consider using arrays
  Trigger:
    X % of queries use $lookup
      X=50 initially
        Slow query logs can include "appName"
    Y % of collection documents have no array fields
      Y=100 initially
    Implies relational design patterns
6. Reduce the size of documents
  Trigger:
    Any collection contains a document larger than X MB
      X=2 initially
    Leads to excess cache pressure
7. Use case-insensitive indexes
  Trigger (AND):
    Any query contains regexes with "/i" suffix
    Collection has no case-insensitive (collation) indexes to satisfy them
    Case-insensitive queries on simple string field indexes are inefficient
    Collation indexes can potentially dramatically improve performance Various embodiments can include segment tracking functions—any one or more and any combination of the following functions can be included in some embodiments:
  Segment events include any one or more and any combination of the following:
    Organization._id
    Group._id
    HostCluster._clusterId
    Host._id
    Feature enum
  Event: Anti-Pattern result viewed
    Wait until anti-pattern request completes
    Fire the event even if no anti-patterns found
    Include list of anti-patterns found:
      Anti-pattern ID (unique human-readable string)
      List of impacted namespaces (e.g., hashed)
        For data explorer typically limited to one
        Obfuscates PII but still allows tracking over time
        E.g., MD5
  Event: Click on docs links
    Lower priority for Product
  Event: Click on Ask The Expert (InterCom) button
    Lower priority for Product Data Explorer Context Examples
  According to some embodiments, the functions discussed for data explorer can be configured to be available at the highest level of a given cluster: Example context include:
    Sharded cluster→cluster
      DE jobs run against mongos
    Replica set→replica set
      DE jobs run against primary host (secondary if unavailable)
    Standalone→host
      DE jobs run against only host
    In further example, the Schema Anti-Pattern Advisor tab can be visible at the collection level within DE
    The agent job ($sample) will be run against the same host as data explorer heartbeats and queries (see above)
  Performance Advisor
  PA is available at the replica set and host levels
    For sharded cluster→the system may require that a user navigate to an individual shard or host
      Shard is treated as a replica set (see below)
    Replica set→replica set
      Analysis (e.g., performance advisor request) run against primary host
    Standalone→host
      Analysis (e.g., performance advisor request) jobs run against only host It should be appreciated that various examples above each describe functions that can be and have been incorporated in different system embodiments together. The examples and described functions are not exclusive and can be used together. In various embodiments, the underlying data stored within a database is encrypted and system is configured to identify anti-pattern in the database using "shapes." The shape being analyzed can be generated by sampling documents in a collection to determine statistical characteristics from the samples. The properties described above can be derived from the sampled and stilled encrypted data. For example, the system is configured to estimate percentage of documents that have arrays in them, or average size of documents per collection.

The following additional anti-pattern examples are described to illustrate additional examples and issues that the system can identify and/or resolve automatically. According to some embodiments, dynamic schema databases (e.g., MongoDB) enables database architects to the ability to store arrays as document field values. Storing arrays as field values allows the database to model one-to-many or many-to-many relationships in a single document, instead of across separate collections as would be required in a relational database.

However, if users are consistently adding elements to arrays in your documents and/or users do not limit the number of elements in an array, the documents may grow to an unpredictable size. For example, as an array continues to grow, reading and building indexes on that array gradually decrease in performance. A large, growing array can strain application resources and put your documents at risk, and for example, cause documents to exceed the BSON Document Size limit.

Various embodiments can monitor data, document, collections of document, etc., to identify large and/or growing arrays. Further, the system can be configured to generate recommendation and/or instructions to impose boundaries on defined arrays to improve performance and documents in the database at a manageable size.

15

Example Array and Establishing Bounding:
Consider the Following Schema for a Publishers Collection:

```
// publishers collection
{
    "_id": "orielly"
    "name": "O'Reilly Media",
    "founded": 1980,
    "location": "CA",
    "books": [
        {
            "_id": 123456789,
            "title": "MongoDB: The Definitive Guide",
            "author": [ "Kristina Chodorow", "Mike Dirolf" ],
            "published_date": ISODate("2010-09-24"),
            "pages": 216,
            "language": "English"
        },
        {
            "_id": 234567890,
            "title": "50 Tips and Tricks for MongoDB Developer",
            "author": "Kristina Chodorow",
            "published_date": ISODate("2011-05-06"),
            "pages": 68,
            "language": "English"
        }
    ]
}
```

In the implementation above, the books array is unbounded. Each new book released by this publishing company adds a new sub-document to the books array. As publishing companies continue to release books, the documents being stored will eventually grow very large and cause a disproportionate amount of memory strain on the application. Various embodiments of the system are configured to monitor database performance, activity, and/or the shape of data being used to identify such conditions.

The system can identify options to avoid the identified mutable/unbounded arrays. For example, the system can generate recommendations to separate the publisher's collection into two collections—one for publishers and one for books. In some examples, instead of embedding the entire book document in the publishers document, the system can generate a recommendation to include a reference to the publisher inside of the book document (as follows):

```
// publishers collection
{
    "_id": "oreilly"
    "name": "O'Reilly Media",
    "founded": 1980,
    "location": "CA"
}
// books collection
{
    "_id": 123456789,
    "title": "MongoDB: The Definitive Guide",
    "author": [ "Kristina Chodorow", "Mike Dirolf" ],
    "published_date": ISODate("2010-09-24"),
    "pages": 216,
    "language": "English",
    "publisher_id": "oreilly"
}
{
    "_id": 234567890,
    "title": "50 Tips and Tricks for MongoDB Developer",
    "author": "Kristina Chodorow",
    "published_date": ISODate("2011-05-06"),
    "pages": 68,
    "language": "English",
    "publisher_id": "oreilly"
}
```

16

In this example, the updated architecture removes the unbounded array in the publishers collection and places a reference to the publisher in each book document using the publisher_id field. This ensures that each document has a manageable size, and there is no risk of a document field growing abnormally large.

In various embodiments, the system can design a series of database states starting with an initial condition (e.g., database with unbounded array) and ending with a database state having two collections as above that resolve the unbounded array problem. In further embodiments, the system can recommend the solution identified, in others, the system can be configured to generate an execution plan to implement the solution identified, and in still others, the system can be configured to automatically implement anti-pattern solutions.

In some embodiments, the recommendation or automatic changes can be monitored to ensure performance is improved. For example, in the above case, document references may require $lookups, which is a computationally expensive operation.

The example above works especially well if an application loads the book and publisher information separately. If the application requires the book and information together, it needs to perform a $lookup operation to join the data from the publishers and books collections. $lookup operations are not very performant, but in this scenario may be worth the trade off to avoid unbounded arrays, thus monitoring of the change can determine performance improvement and/or degradation. If there is a reduction in performance over a time (e.g., system or admin set threshold) the system can recommend reversing the changes. Other embodiments can also generate state transitions to return the database to a prior architecture.

In one alternative and/or embodiment, where frequently use of $lookup occurs, another option is to use an extended reference pattern. According to one embodiment, an extended reference pattern is a modification of the previous approach where the system duplicates some—but not all—of the data in the two collections. In the example, the system only duplicates the data that is frequently accessed together. In the following example, the application has a user profile page that displays information about the user as well as the name of the building and the state where they work, the database may be more efficient if it defines an embedding of the building name and state fields in the employee document:

Example Starting Condition:

```
// buildings collection
{
    "_id": "city_hall",
    "name": "City Hall",
    "city": "First",
    "state": "IN",
    "employees": [
        {
            "_id": 123456789,
            "first": "Leslie",
            "last": "Yepp",
            "cell": "8125552344",
            "start-year": "2004"
        },
        {
            "_id": 234567890,
            "first": "Ron",
            "last": "Swandaughter",
```

-continued

```
            "cell": "8125559347",
            "start-year": "2002"
        }
    ]
}
```

Extended Reference Example:

```
                    // buildings collection
{
    "_id": "city hall",
    "name": "City Hall",
    "city": "First",
    "state": "IN"
}
//employees collection
{
    "_id": 123456789,
    "first": "Leslie",
    "last": "Yepp",
    "cell": "8125552344",
    "start-year": "2004",
    "building": {
        "name": "City Hall",
        "state": "IN"
    }
},
{
    "_id": 234567890,
    "first": "Ron",
    "last": "Swandaughter",
    "cell": "8125559347",
    "start-year": "2002",
    "building": {
        "name": "City Hall",
        "state": "IN"
    }
}
```

In various embodiments, the system can be configured to limit duplicating data that will frequently be updated. In the example above, the name of the building and the state the building is in are very unlikely to change, so this solution works. Further embodiments, can monitor data shapes to confirm such fields do not change with great frequency or a frequency above a set threshold. Data shapes can be based on hashes taken on data. The data shape can be used so that the underlying data is not accessed, exposed, or reviewed as part of recommendations or automatic changes.

Example Anti-Pattern—Number of Collections Exceeds Threshold

In various embodiments, every collection created can include an index on the _id field. While the size of this index is pretty small for empty or small collections, thousands of empty or unused indexes can begin to impact or drain resources. In further examples, collections will typically have a few more indexes to support efficient queries. All of these indexes add up and can cause performance issues.

Further considerations include the use of the WiredTiger storage engine in MongoDB, which stores a file for each collection and a file for each index. As the storage engine is configured to open all files upon startup, performance will decrease when an excessive number of collections and indexes exist. In general terms, a limit on collections to 10,000 per replica set should be established, absent other considerations. For example, when users begin to exceed 10,000 collections, the users typically see decreases in performance.

The system can be configured to identify, avoid, and/or resolve this anti-pattern. In one example, the system can examine the database to identify unnecessary collections (e.g., not used, not reference, not accessed, etc.) The system can also identify trends in collection numbers and identify when performance issues are expected based on collection numbers.

Example Collection

In one embodiment, a database contains information on state parks and the users wants to keep a minute-by-minute record of the water level and temperature of the first river, the second river, and the third river, to look for trends. Sensors capture and store the data in a MongoDB database.

One way to store the data would be to create a new collection every day to store sensor data. Each collection would contain documents that store information about one reading for one sensor.

```
// 2020-05-01 collection
{
    "_id": ObjectId("5eac643e64faf3ff31d70d35"),
    "river": "FirstRiver",
    "sensor": 1
    "timestamp": "2020-05-01T00:00:00Z",
    "water-level": 61.56,
    "water-temperature": 72.1
},
{
    "_id": ObjectId("5eac643e64faf3ff31d70d36"),
    "river": "FirstRiver",
    "sensor": 2
    "timestamp": "2020-05-01T00:00:00Z",
    "water-level": 61.55,
    "water-temperature": 72.1
},
...
{
    "_id": ObjectId("5eac643e64faf3ff31d70dfc"),
    "river": "ThirdRiver",
    "sensor": 90
    "timestamp": "2020-05-01T23:59:00Z",
    "water-level": 72.03,
    "water-temperature": 64.1
}
// 2020-05-02 collection
{
    "_id": ObjectId("5eac644c64faf3ff31d90775"),
    "river": "FirstRiver",
    "sensor": 1
    "timestamp": "2020-05-02T00:00:00Z",
    "water-level": 63.12,
    "water-temperature": 72.8
},
{
    "_id": ObjectId("5eac644c64faf3ff31d90776"),
    "river": "FirstRiver",
    "sensor": 2
    "timestamp": "2020-05-02T00:00:00Z",
    "water-level": 63.11,
    "water-temperature": 72.7
},
...
{
    "_id": ObjectId("5eac644c64faf3ff31d9079c"),
    "river": "ThirdRiver",
    "sensor": 90
    "timestamp": "2020-05-02T23:59:00Z",
    "water-level": 71.58,
    "water-temperature": 66.2
}
```

The users want to be able to easily query on the river and sensor fields, so the users define an index on each field. If the users were to store hourly data throughout all of 2019 and create two indexes in each collection (in addition to the default index on_id), her database would have the following stats:

Database size: 5.2 GB

Index size: 1.07 GB

Total Collections: 365

Each day the users create a new collection and two indexes. As the users continue to collect data and her number of collections exceeds 10,000, the performance of her database will decline.

According to one embodiment, the system can recommend an architecture change to the database. For example, the system can suggestion an architecture to keep all of the data in a single collection. The new architecture can used buckets for information, so the database stores one hour's worth of information from one sensor in each document.

If the users were to store hourly data for all of 2019 using this updated schema, the database would have the following stats:

Database size: 3.07 GB

Index size: 27.45 MB

Total Collections: 1

Here the default index on _id is leveraged to improve performance by storing the hour the water level data was gathered in this field. Thus, if the users want to query by hour, the database already has an index to allow the users to efficiently do so.

Indexes take up space. Typically each index is at least 8 kB and grows with the number of documents associated with it. Thousands of indexes can begin to drain resources.

Indexes can impact storage engine performance. For engines that store a file for each collection and for each index, the storage engine will typically open all files upon startup, so performance will decrease when an excessive number of collections and indexes exist.

Indexes can impact write performance. Whenever a document is created, updated, or deleted, any index associated with that document must also be updated. These index updates negatively impact write performance.

In various embodiments, the system can be configured to identify unnecessary indexes based on usage data, and/or redundancy with other indexes (e.g., a compound index covers the index).

In further embodiments, documents can include too much data form performance considerations. The following example collection highlights potential issues:

```
// InspirationalWomen collection
{
    "_id": {
        "$oid": "5ec81cc5b3443e0e72314946"
    },
    "first_name": "Sally",
    "last_name": "Ride",
    "birthday": 1951-05-26T00:00:00.000Z,
    "occupation": "Astronaut",
    "quote": "I would like to be remembered as someone who was not afraid to do
        what she wanted to do, and as someone who took risks along the
        way in order to achieve her goals.",
    "hobbies": [
        "Tennis",
        "Writing children's books"
    ],
    "bio": "Sally Ride is an inspirational figure who... ",
    ...
}
```

In various embodiments, the system may not definitively know what collections are unnecessary, so the system is configured to facilitate review of the database and highlight areas for investigation. If the system finds an empty collection, the system can drop it. If the system finds a collection whose size is made up mostly of indexes, the system can suggest or create a state change plan to move that data into another collection and drop the original. Further the system can recommend or evaluate options to use $merge to move data from one collection to another.

According to other examples, an unused index represents a burden on performance with no benefit. The system can be configured to identify indexes with no or low usages patterns, and surface recommendations in the user interface to remove them. There are many reasons why users should remove unnecessary indexes, some include:

The query on this collection is displayed on a homepage that only needs to retrieve each woman's first name and last name. Having this information in the working set is crucial to improving performance. The other information about each woman (including a lengthy bio) doesn't necessarily need to be in the working set. Frequently accessed documents and index pages are referred to as the working set.

To improve performance a collection containing the needed information for the home page can be created with another collection to store additional information. Here the users can break up the information in the InspirationalWomen collection into two collections: InspirationalWomen_Summary and InspirationalWomen_Details. The users create a manual reference between the matching documents in the collections. Below are the new documents for Sally Ride:

```
// InspirationalWomen_Summary collection
{
    "_id": {
        "$oid": "5ee3b2a779448b306938af0f"
    },
    "inspirationalwomen_id": {
        "$oid": "5ec81cc5b3443e0e72314946"
```

-continued

```
    },
    "first_name": "Sally",
    "last_name": "Ride"
}
copy code
// InspirationalWomen_Details collection
{
    "_id": {
        "$oid": "5ec81cc5b3443e0e72314946"
    },
    "first name": "Sally",
    "last name": "Ride",
    "birthday": 1951-05-26T00:00:00.000Z,
    "occupation": "Astronaut",
    "quote": "I would like to be remembered as someone who was not afraid to do
        what she wanted to do, and as someone who took risks along the
        way in order to achieve her goals.",
    "hobbies": [
        "Tennis",
        "Writing children's books"
    ],
    "bio": "Sally Ride is an inspirational figure who... ",
    ...
}
```

In further embodiments, the system can be configured to identify field needs for a page's display or the sources of information for a query, and recommending a collection split to separate targeted data out with a reference to additional data in another collection. In other embodiments, the system can create a state plan to achieve the separation of the data for the users.

Example Anti-Pattern—Separating Data Accessed Together

The inventors have realized that normalizing data and splitting it into different pieces to optimize for space and reduce data duplication may be beneficial practice in relational data architectures, however, separating data that is frequently accessed together is actually an anti-pattern in dynamic schema settings (e.g., MongoDB, etc.).

Much like users would use a join to combine information from different tables in a relational database, MongoDB has a $lookup operation that allows users to join information from more than one collection. $lookup is great for infrequent, rarely used operations or analytical queries that can run overnight without a time limit. However, $lookup is not so great when frequently used in applications as they are resource-intensive and often slow.

Various embodiments are configured generate recommendations or state transitions to leverage embedding and arrays to keep the data together in a single collection where the system identifies separation of data that is frequently used together between multiple collections.

The system can analyze the resulting collection, and determine if combining data from separate collections into a single collection will result in massive, unbounded arrays or bloated documents. In these examples, the system can recommend or generate architectures that keep the collections separate and duplicate some of the data that is used frequently together in both collections. For example, the system can recommend or generate a subset pattern to duplicate a subset of the documents from one collection in another. In one alternative and/or embodiment, the system can recommend or generate options to use the extended reference pattern to duplicate a portion of the data in each document from one collection in another. In both patterns, users have the option of creating references between the documents in both collections. The system can also be configured to remind users that whenever you need to combine information from both collections, the users will likely need to use $lookup, and, in another example, whenever users duplicate data, the users are responsible for ensuring the duplicated data stays in sync.

Various embodiments are configured to identify the conditions when data that is accessed is not stored together as an anti-pattern. For example, the system can identify frequently reads or updates on information stored separately. The system can generate options for storing the information together (e.g., using nested documents or arrays). In some settings, the system can present options as recommendations or as executable selections that the user can select in the user interface.

Additional Anti-Pattern Behavior: Case Insensitive Queries

Given a dynamic schema database with multiple query modes (e.g., MongoDB), users can run a case-insensitive query using $regex with an i option. These queries return case-insensitive results. However, queries that use $regex cannot efficiently utilize case-insensitive indexes, so these queries can be very slow depending on how much data is in your collection. Users can run a case-insensitive query by creating a case-insensitive index (meaning it has a collation strength of 1 or 2: where 1 is a primary level of comparison and collation performs comparisons of the base characters only, ignoring other differences such as diacritics and case; and 2 specifies a secondary level of comparison where collation performs comparisons up to secondary differences, such as diacritics (e.g., collation performs comparisons of base characters (primary differences) and diacritics (secondary differences) and differences between base characters takes precedence over secondary differences)) and running a query with the same collation as the index. A collation defines the language-specific rules that the database will use for string comparison. Indexes can optionally have a collation with a strength that ranges from 1 to 5. A query that is run with the same collation as a case-insensitive index will return case-insensitive results. Since these queries are covered by indexes, they execute very quickly. User you can also run a case-insensitive query by setting the default collation strength for queries and indexes to a strength of 1 or 2 when the users create a collection. All queries and indexes in a collection automatically use the default collation unless the users specify otherwise when the users execute a query or create an index. Therefore, when the users set the default collation to a strength of 1 or 2, the users will get case-insensitive queries and indexes by default.

In the above examples, the system can be configured to identify options to build case insensitive indexes that can be used to response to case incentive queries, and avoid used of functions that cannot leverage case insensitive indexes (e.g., regex option i).

Example Interface

Figure 7:
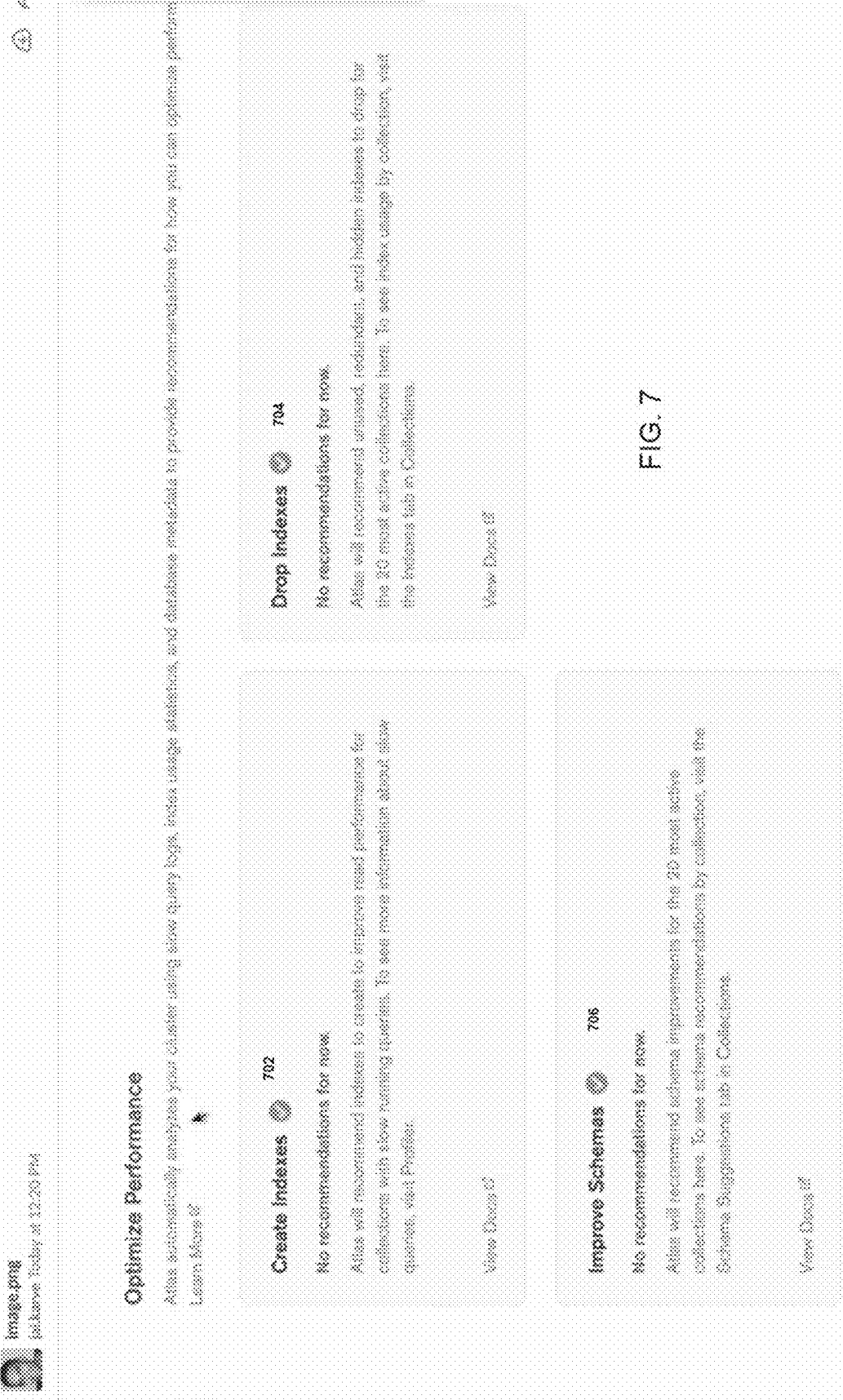
FIG. 7 is an example screen capture, according to one embodiment.

Shown in FIG. 7 is a screen capture of an example user interface. According to some embodiments, the system can display user interface screens to access anti-pattern functions and/or recommendations. For example, the system can monitor performance characteristics associated with a database implementation and identify when creation of an index can improve performance (e.g., 702), deletion of an index improves performance (e.g., 704), and/or schema changes improve performance. Each recommendation and/or sets of recommendations can be grouped into display tiles (e.g., 702-706). Responsive to selection of the tile the system can transition to a display of recommendations in respective groups. Each recommendation can include a selectable icon to execute the recommendation that is configured to transition the database instance through a series of states, starting with a current state and ending with the database instance having the recommended properties. In other embodiments, the recommendations can include operations to perform that can be executed by database administrators.

Figure 6:
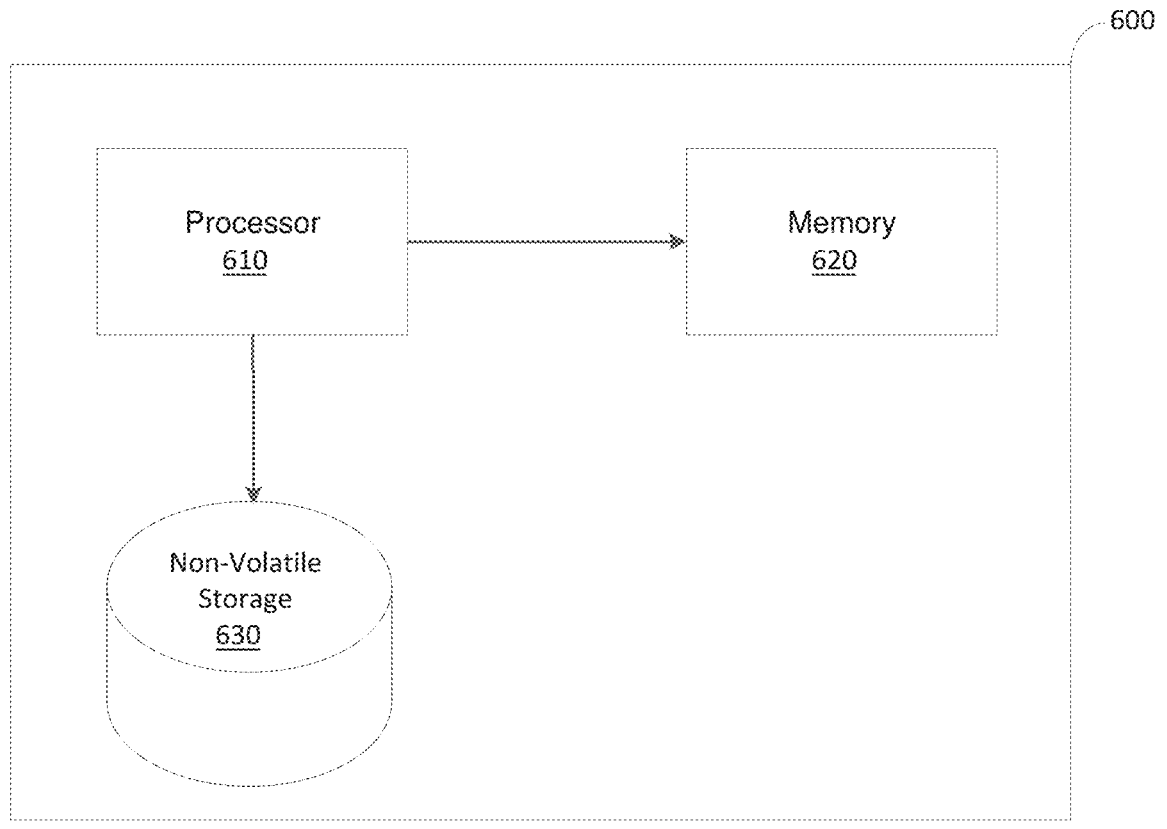
FIG. 6 is an example block diagram of a special purpose computer system that can be configured to execute the functions discussed herein.

Modifications and variations of the discussed embodiments will be apparent to those of ordinary skill in the art and all such modifications and variations are included within the scope of the appended claims. An illustrative implementation of a computer system 600 that may be used in connection with any of the embodiments of the disclosure provided herein is shown in FIG. 6. The computer system 600 may include one or more processors 610 and one or more articles of manufacture that comprise non-transitory computer-readable storage media (e.g., memory 620 and one or more non-volatile storage media 630). The processor 610 may control writing data to and reading data from the memory 620 and the non-volatile storage device 630 in any suitable manner. To perform any of the functionality described herein, the processor 610 may execute one or more processor-executable instructions stored in one or more non-transitory computer-readable storage media (e.g., the memory 620), which may serve as non-transitory computer-readable storage media storing processor-executable instructions for execution by the processor 610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A performance monitoring system, the system comprising:

at least one processor operatively connected to a memory, the at least one processor when executing configured to:

identify a pattern associated with non-optimal implementation in a distributed database deployment including a dynamic schema architecture, wherein the non-optimal implementation reduces efficiency of reading and/or writing data when present in the distributed database deployment, wherein:

the distributed database deployment is configured to store data without a predefined schema and dynamically implement a data architecture or data model as a result of storing the data in at least one collection in the distributed database deployment, and the identifying comprises:

determine, using sample data from the at least one collection, that the data stored in the at least one collection meets at least one trigger condition comprising at least one threshold performance metric indicating that operations performed to store the sample data reduced the efficiency of reading and/or writing data in the distributed database deployment; and identify the pattern associated with the non-optimal implementation based on determining that the data stored in the at least one collection meets the at least one threshold performance metric;

determine a recommendation associated with the pattern for the distributed database deployment; and display in a user interface the recommendation and selectable element configured to render resolution information responsive to selection in the user interface.

2. The system of claim 1, wherein the at least one processor is configured to determine a user context for performance analysis based on, at least in part, selections in the user interface.

3. The system of claim 2, wherein the at least one processor is further configured to limit target data reviewed when executing operations to identify the pattern associated with the non-optimal implementation based on the determined user context.

4. The system of claim 3, wherein the user context includes a data explorer context and the target data reviewed is limited to one or more collections identified in the user interface.

5. The system of claim 1, wherein the at least one processor is configured to generate data shape information from data stored in the distributed database deployment.

6. The system of claim 5, wherein the data shape information maintains secrecy of the underlying data and is configured for pattern based analysis to determine the non-optimal implementation.

7. The system of claim 1, wherein the at least one trigger condition includes one or more of the following trigger conditions:

at least one of the plurality of documents of the at least one collection contains an array that is greater than a threshold size;

the database deployment includes more than a threshold number of namespaces;

the at least one collection includes more than a threshold number of indexes;

a threshold percentage of queries executed against the at least one collection use a lookup operation;

a threshold percentage of the plurality of documents of the at least one collection do not include an embedded document field;

a threshold percentage of the plurality of documents of the at least one collection do not include an array field;

at least one of the plurality of documents of the at least one collection is larger than a threshold document size; and the at least one collection does not include a case-insensitive index and at least one query executed against the at least one collection is case-insensitive.

8. The system of claim 1, wherein the identification comprises:

analyze data stored in at least one of a plurality of documents sampled from the at least one collection.

9. The system of claim 8, wherein the at least one document comprises a file and data interchange format that uses human-readable text to store and transmit data objects including attribute-value pairs, references, and arrays.

10. The system of claim 8, wherein the at least one processor is configured to generate collection shapes based on hash values of respective collections, and associate performance information with the collection shapes.

11. The system of claim 1, wherein:

the data architecture or data model implemented by the dynamic schema changed over a time period; and the at least one processor is further configured to identify the pattern associated with the non-optimal implementation based on determining that the data in the at least one collection meets the at least one threshold performance metric by performing:

determine that at least one performance metric of the data in the at least one collection meets the at least one threshold metric after the time period.

12. A computer implemented method for monitoring performance is a distributed database, the method comprising:

identifying, by at least one processor, a pattern associated with non-optimal implementation in a distributed database deployment including a dynamic schema architecture, wherein the non-optimal implementation reduces efficiency of reading and/or writing data when present in the distributed database deployment, wherein:

the distributed database deployment is configured to store data in at least one collection without a predefined schema and dynamically implement a data architecture or data model as a result of storing the data in at least one collection in the distributed database deployment, and the identifying comprises:

determining, using sample data from the at least one collection, that the data stored in the at least one collection meets at least one trigger condition comprising a threshold performance metric indicating that operations performed to store the sample data reduced the efficiency of reading and/or writing data in the distributed database deployment; and identifying the pattern associated with the non-optimal implementation based on determining that the data in the at least one collection meets the threshold performance metric;

determining, by the at least one processor, a recommendation associated with the pattern for the distributed database deployment; and displaying, by the at least one processor, in a user interface, the recommendation and selectable element configured to render resolution information responsive to selection in the user interface.

13. The method of claim 12, wherein the method further comprises determining a user context for performance analysis based on, at least in part, selections in the user interface.

14. The method of claim 13, wherein the method further comprises limiting, by the at least processor, target data reviewed when executing operations to identify the pattern associated with the non-optimal implementation based on the determined user context.

15. The method of claim 12, wherein the method further comprises generating data shape information from data stored in the distributed database deployment.

16. The method of claim 15, wherein the data shape information maintains secrecy of the underlying data, and is configured for pattern based analysis to determine the pattern associated with the non-optimal implementation.

17. The method of claim 12, wherein the method further comprises generating an execution plan to take a database from a first state associated with a non-optimal implementation to a second state resolving the non-optimal implementation.

18. The method of claim 12, wherein the identifying further comprises analyzing data stored in at least one of a plurality of documents sampled from the at least one collection.

19. The method of claim 18, wherein the at least one document comprises a file and data interchange format that uses human-readable text to store and transmit data objects including attribute-value pairs, references, and arrays.

20. The method of claim 18, wherein the method further comprises generating collection shapes based on hash values of respective collections, and associating performance information with the collection shapes.

* * * * *